United States Patent [19]

Tallon

[11] 4,365,158
[45] Dec. 21, 1982

[54] HELIUM LEAKAGE DETECTOR

[75] Inventor: Jacques Tallon, Annecy, France

[73] Assignee: Societe Anonyme Dite: Compagnie Industrielle des Telecommunications Citalcatel, Paris, France

[21] Appl. No.: 233,236

[22] Filed: Jan. 10, 1981

[30] Foreign Application Priority Data

Feb. 11, 1980 [FR] France ................................ 80 02923

[51] Int. Cl.³ .............................................. B01D 59/44
[52] U.S. Cl. ...................................... 250/288; 73/40.7
[58] Field of Search .................. 250/288, 457; 73/40.7

[56] References Cited

U.S. PATENT DOCUMENTS 3,342,990  9/1967  Barrington et al. ................. 250/288
3,842,266 10/1974  Thomas .............................. 250/288
3,968,675  7/1976  Briggs .

*Primary Examiner*—Bruce C. Anderson
*Attorney, Agent, or Firm*—Sughrue, Mion, Zinn, Macpeak & Seas

[57] ABSTRACT

The invention relates to a helium leakage detector. It includes a measuring spectrometric cell (8) disposed in parallel with a molecular diffusion pump (6) whose outlet (7) is short-circuited at the inlet (5) by a pipe (10) upstream from a constriction (11) constituted by an adjustable valve.

4 Claims, 1 Drawing Figure

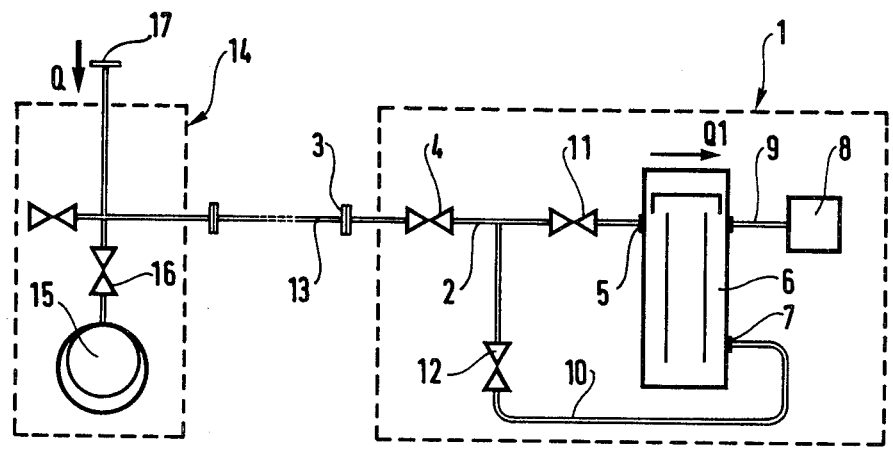

HELIUM LEAKAGE DETECTOR

The invention relates to a helium leakage detector including a mass spectrometer.

BACKGROUND OF THE INVENTION

Such apparatus includes a spectrometric cell for observing and measuring the quantity of helium molecules which successively pass through a vapour trap (which is generally of the liquid nitrogen type), a diffusion pump and a vane pump.

Its disadvantage is that it is complicated and therefore expensive, while its high level of performance is not always essential.

SUMMARY OF THE INVENTION

The invention provides a helium detector which includes a simplified mass spectrometer at reasonable cost price.

More precisely the present invention provides a helium leakage detector including a mass spectrometer, wherein said spectrometer comprises a measuring spectrometric cell disposed in parallel with a molecule diffusion pump whose outlet is short-circuited at the inlet by a pipe upstream from a constriction, which may advantageously be constituted by an adjustable valve.

The detector may also include an isolating valve at its inlet, a draw-off valve at the inlet of the diffusion pump and a measuring valve on the short-circuit pipe.

The detector may further include a trap between the diffusion pump and the spectrometric cell.

Another trap may be inserted between the draw-off valve and the inlet of the diffusion pump.

BRIEF DESCRIPTION OF THE DRAWING

The single FIGURE of the accompanying drawing schematically illustrates a helium leakage detector in accordance with the invention.

DETAILED DESCRIPTION

A leakage detector assembly 1 has an inlet pipe 2, an inlet flange 3 and an isolating valve 4.

The inlet pipe 2 communicates with an inlet 5 of a diffusion pump 6 via a diaphragm or constriction which can be constituted by an adjustable draw-off valve 11. A spectrometric measuring cell 8 of a spectrometer is connected to the diffusion pump 6 via a pipe 9.

Further, the outlet 7 of the diffusion pump 6 is connected by a pipe 10 and a measuring valve 12 to a connection point between the valves 4 and 11 on the pipe 2.

During use, the inlet flange 3 of the detector 1 is connected by a pipe 13 to an auxiliary pumping unit 14 which includes a vane pump 15 with an isolating valve 16 and a flange 17 for connecting to an installation (not shown) which is to be tested.

Operation is as follows. In this apparatus, a helium flux Q which comes from the installation could give a helium flux $Q1 = nQ$ in the looped circuit of the spectrometer, where $n > 1$. The ratio n is related to the pumping speeds at the inlet of the spectrometer spectrometric measuring cell 8 and of the auxiliary pump of this unit. The apparatus is therefore a flux amplifier apparatus.

In conventional apparatus, where the outlet pipe 7 of the diffusion pump 6 is connected to an auxiliary vane pump, in the circuit of the spectrometer, the helium flux Q which enters the installation gives a smaller flux $q = Q/n$ where $n > 1$, n also being a function of the pumping speeds at the inlet of the spectrometer and at the inlet of the auxiliary pump.

With this apparatus, gas can be drawn from the inlet circuit, and by closing the inlet valve 4 the gas can be maintained for some time for measuring purposes. Indeed, the flux Q1 circulates at a constant value in the circuit of the closed loop of the diffusion pump 6. It is possible to obtain the reading of the flux Q entering the installation by closing the valve 12 on the pipe 10. The flux is then measured by closing the valve 12 and the isolating valve of the auxiliary pump 15 after the flux Q1 has been established. The flux Q thus flows from the inlet 3 to the outlet 7 of the diffusion pump 6 closed by the valve 12. Helium accumulates in the volume of pipe 10 situated between the outlet 7 and the valve 12. This is not a drawback since the diffusion pump prevents helium from being diffused back towards the spectrometric cell 8.

Another advantage of this apparatus is that a detector without a vane pump and without an extra connecting flange for such a vane pump can be formed.

In a variant, if it is necessary to protect the spectrometric cell 8, some kind of trap can be inserted between the diffusion pump 6 and the cell 8. The trap may be of the liquid nitrogen, ion or, even, zeolite type, for example.

Further, to improve pumping, it is also possible to place a trap between the draw-off valve 11 and the inlet 5 of the diffusion pump 6.

I claim:

1. A helium leakage detector including an inlet pipe and a mass spectrometer, the improvement wherein said detector includes a molecular diffusion pump, said spectrometer includes a measuring spectrometric cell, and said cell is disposed in parallel with said molecular diffusion pump, an isolating valve within said inlet pipe upstream of said molecular diffusion pump, said molecular diffusion pump having an inlet and an outlet and whose outlet is short-circuited at the diffusion pump inlet by a short-circuit pipe, said short-circuit pipe connecting to said inlet pipe downstream of said isolating valve and upstream of said diffusion pump inlet, and a constriction being provided between the diffusion pump outlet and inlet within the short-circuit pipe; whereby, the necessity of using a vane pump is avoided, allowing a recirculating loop of gas to be maintained within the system for some period of time for measuring purposes.

2. A detector according to claim 1, wherein the constriction is constituted by an adjustable valve.

3. A detector according to claim 1, further including an isolating valve placed on the inlet pipe.

4. A detector according to claim 1 or claim 3, further including a measuring valve on the short-circuit pipe.

* * * * *